June 9, 1931.  C. G. MILLER  1,809,139
AUTOMATIC WORK SHIFT FOR PLATING MACHINES
Original Filed June 30, 1928    3 Sheets-Sheet 1
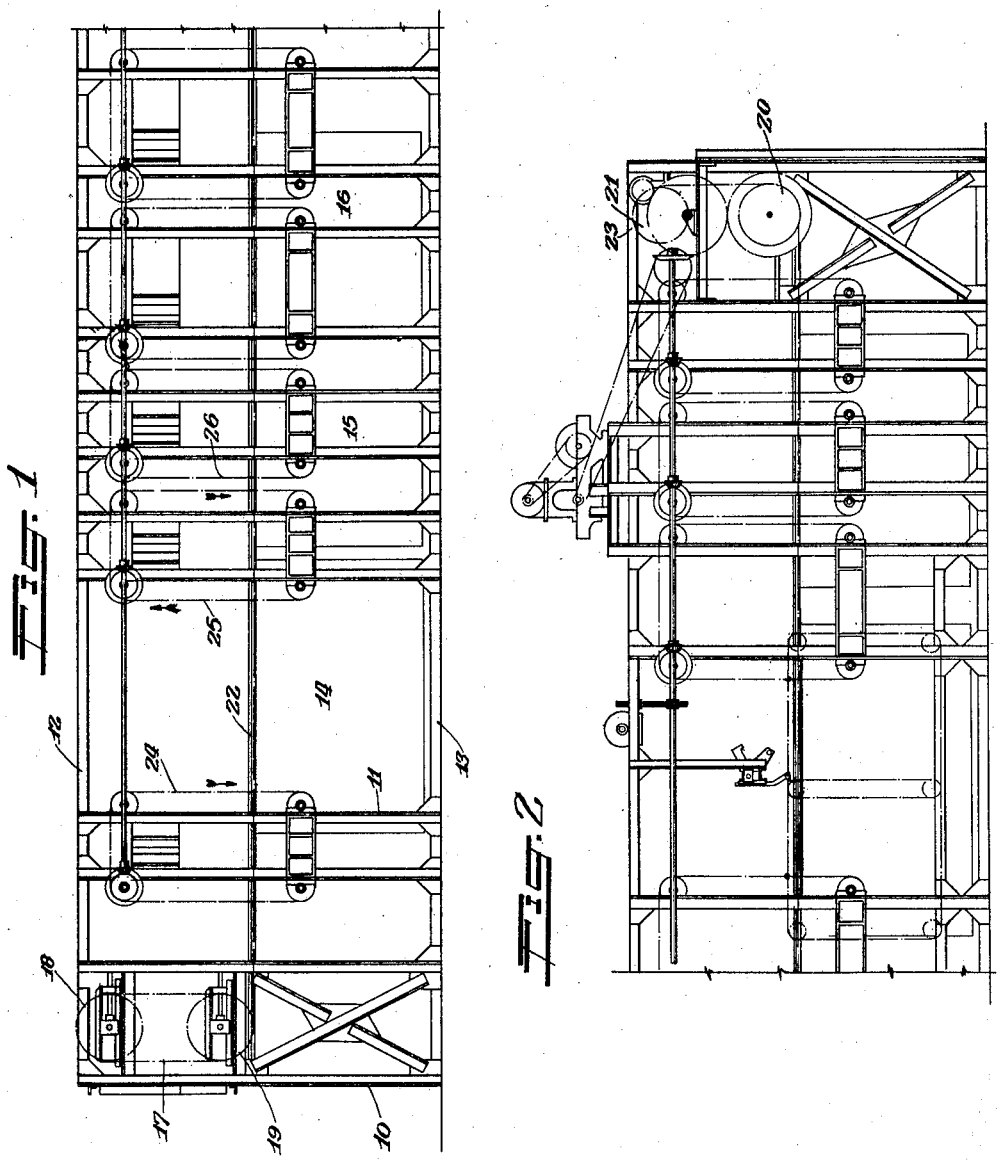
Inventor
Constantine G. Miller.
by: Charles H. Sills
Attys.

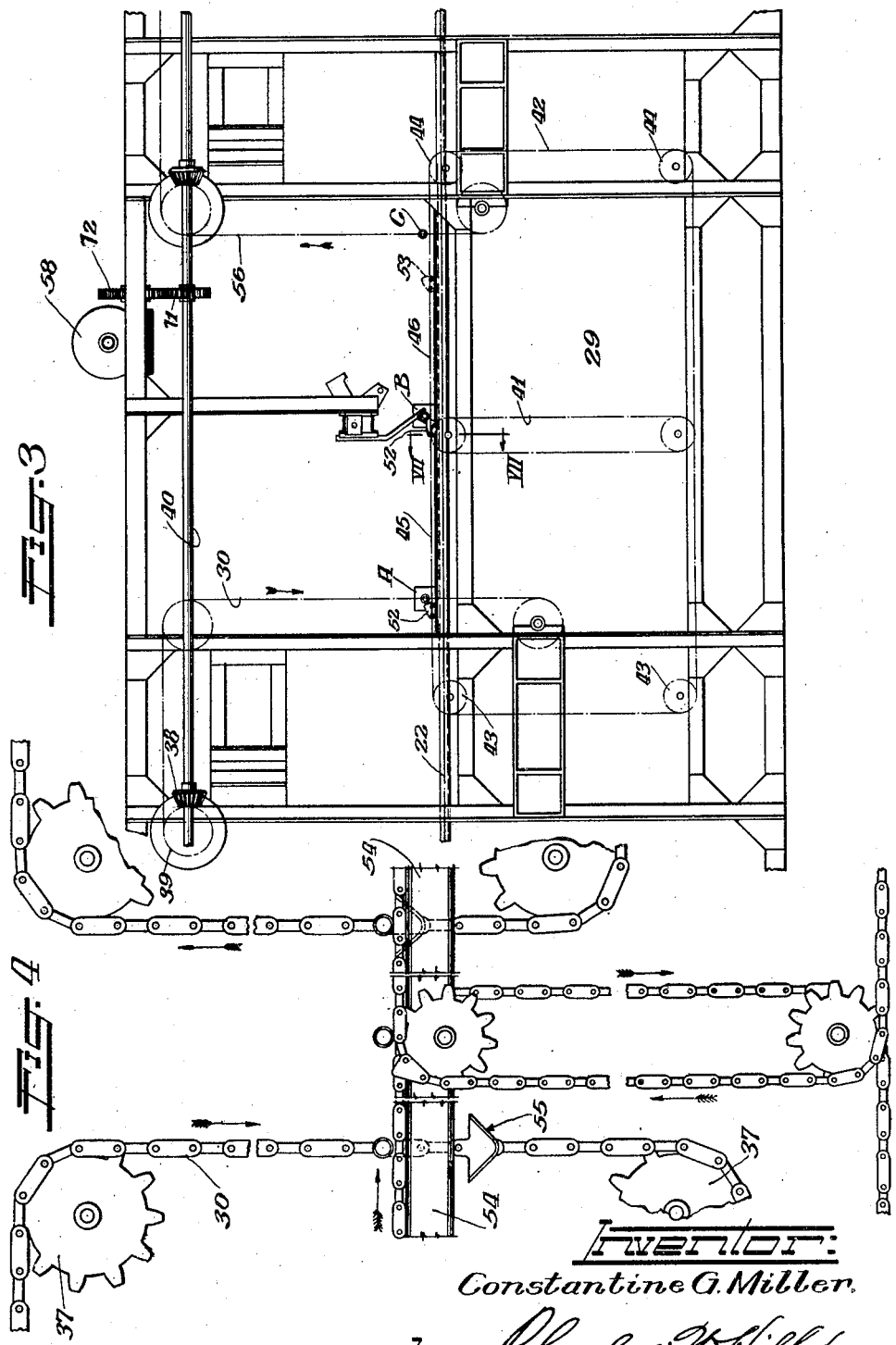

June 9, 1931.  C. G. MILLER  1,809,139
AUTOMATIC WORK SHIFT FOR PLATING MACHINES
Original Filed June 30, 1928    3 Sheets-Sheet 3
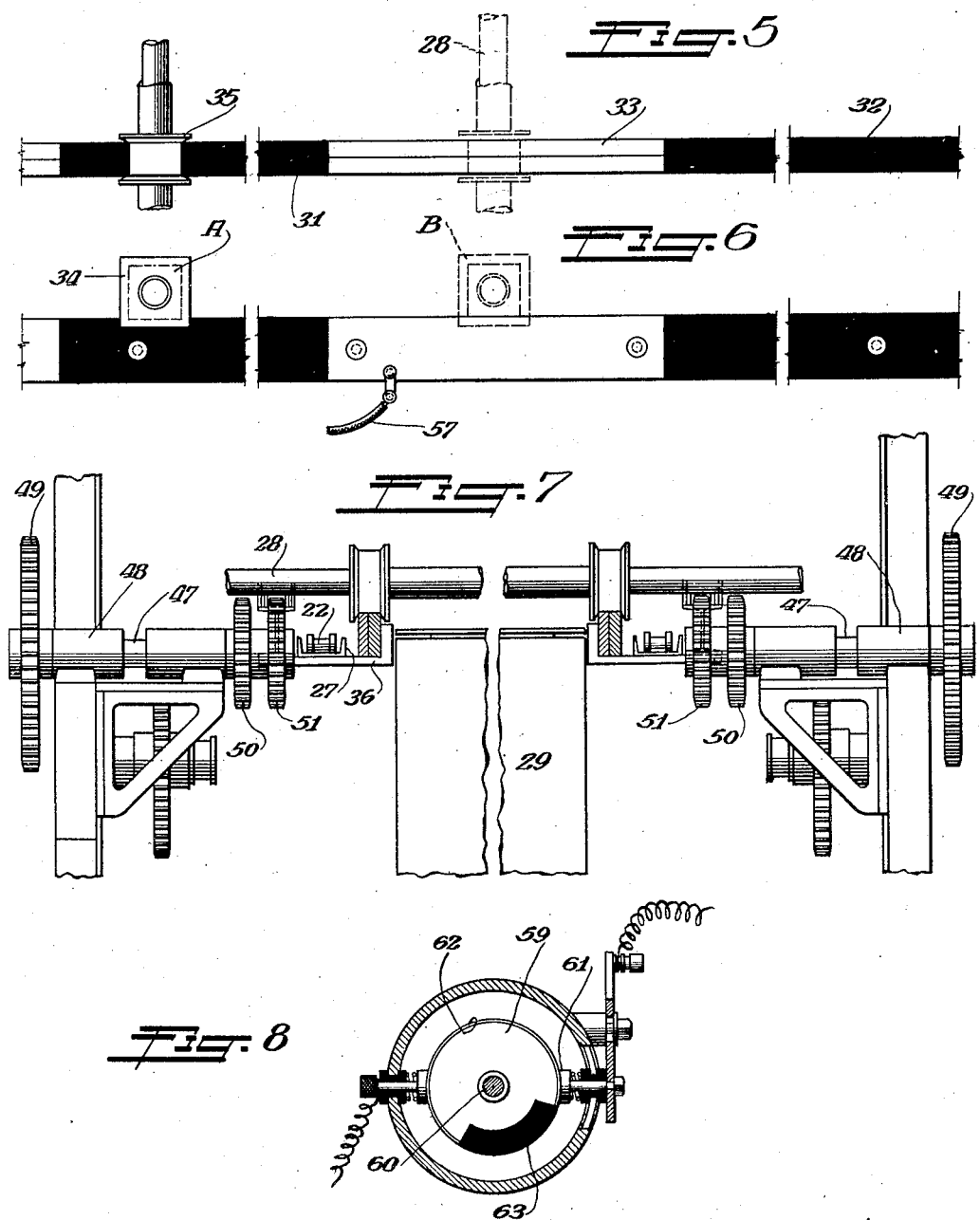
Inventor:
Constantine G. Miller.
by: Charles H. Kills
Attys.

Patented June 9, 1931

1,809,139

UNITED STATES PATENT OFFICE

CONSTANTINE G. MILLER, OF CHICAGO, ILLINOIS, ASSIGNOR TO THE MEAKER COMPANY, A CORPORATION OF ILLINOIS

AUTOMATIC WORK SHIFT FOR PLATING MACHINES

Application filed June 30, 1928, Serial No. 289,589. Renewed September 4, 1929.

This invention relates to electro-plating machines and particularly to an automatic work shift for such machines.

I have found that articles may be successfully automatically plated with chromium in a machine where the work rod, which is the cathode, is brought to rest in the plating bath, and while at rest, an electric current of predetermined density is supplied to the work rod. I have found that by stopping the work rod before the current is supplied thereto and cutting off the current before the rod is moved very successful results are obtained. The current preferably employed is one with a voltage between 6 and 12 and with the amperage running from 150 amperes per square foot upwards.

The work rod arranged in accordance with my invention is automatically delivered to the plating tank, automatically moved to a position of rest in the tank where it remains for a predetermined period of time. During this period of time, the current of predetermined density is supplied to the work rod and automatically cut off, whereupon the rod is moved automatically to a position to be engaged by a transfer mechanism for removing the rod and its supported articles from the bath.

No current is supplied to the rods while being delivered to or removed from the tank or while being moved to or from the rest position.

This invention is directed to an automatic intermittent work shift for controlling the progress of work rods through the plating tank for successful chromium plating.

An object of the invention is to provide an automatic intermittent work shift for chromium plating machines.

Another object is to provide an automatic intermittent work shift for chromium plating machines in which the work rods are received, brought to rest in the plating tank, put in circuit while at rest, and then removed, all in automatic timed relation in such manner that the only current supplied to the work rods is that supplied to the rod in rest position while other rods are being moved with respect to the rod at rest in the plating tank.

A further object is to provide an automatic intermittent work shift in which continuously moving chains are provided for intermittently moving the work rods along the tank, the chains being arranged with fingers or lugs to engage the rods at different timed intervals to carry out the steps of: (1) receiving the rod, (2) moving the rod to rest position, (3) permitting a stay of the rod in rest position, and (4) removing the rod from rest position and delivering it to a transfer mechanism, and (5) removing the rod from the tank.

A further object is to provide an automatic intermittent work shift mechanism for chromium plating tanks whereby a rod may be automatically received in the tank, moved to rest position, and while at rest position, put in circuit with an electric current of predetermined density for a predetermined time, and then removing the rod, with the moving mechanism and current regulator so correlated that the current is supplied to the rod only when in the rest position and for an interval of time no longer than the rest period of the rod.

A further object is to provide means for transferring work rods from a main conveyor to a supplemental conveyor for the plating section and there moving the rod in step by step movement through the plating bath and subjecting said rod to an electric current for a portion of the time that the rod is in the bath.

A further object is to provide an automatic intermittent work shift for plating machines which is efficient and positive in opertion for successful commercial use.

Other and further objects of the invention will be apparent from the following description, drawings and appended claims.

The invention includes a supplemental trackway over the top of a chromium plating tank with a bus bar in each of the trackways intermediate the ends of the same, with the balance of the trackways made of insulated material.

The supplemental conveyor mechanism for the plating section includes two chains on each side of the tank which are endless and arranged with the active runs of the same in the same horizontal plane near the trackways and so placed and driven that the delivery end of one chain is adjacent the pick-up end of the next. Fingers or lugs are attached to these chains in such a manner that a time interval intervenes between the delivery of the rod by the first chain and the pick-up of the rod by the second chain. The finger or lugs are adjustable to vary this time interval.

The work shift mechanism of this invention may be used in a chromium plating machine set forth in my copending application, Serial No. 289,588, filed June 30.

The preferred embodiment of the invention is shown in the accompanying drawings and the views thereof are as follows:

Figure 1 is a side elevational view, somewhat diagrammatic in form, of the receiving end of an electro-plating machine.

Figure 2 is a side elevational view, somewhat diagrammatic in form, of the delivery end of an electro-plating machine embodying this invention.

Figure 3 is an enlarged side elevational view, somewhat diagrammatic in form, of the plating section of the machine.

Figure 4 is an enlarged fragmental side elevation of the transfer and conveyor chains for the plating section.

Figure 5 is a fragmental top plan view of one of the trackways used in the plating section.

Figure 6 is a side elevation of the trackway of Figure 5.

Figure 7 is an enlarged partial vertical view taken on line VII—VII of Fig. 3 showing details of construction and with the chains omitted.

Figure 8 is a vertical transverse section through a current controller utilized in controlling the current supplied to the work rod while in the plating section.

An electro-plating machine may be made as long as necessary to include the various tanks required for the preliminary stages of cleaning, rinsing and the like, of the articles which are to be plated. The machine is so arranged that the articles may be moved continuously through the machine and treated successively in the various tanks included in the machine.

The machine comprises a framework of structural material including uprights 10 and 11, horizontal top and bottom members 12 and 13, and the usual cross members to form a rigid structure.

Electro-plating machines in which the materials are passed successively through various tanks have been heretofore known. I shall not describe in detail the construction of the framework and the various conveyor mechanisms in the machine prior to the plating section of the machine.

Tanks 14, 15 and 16 are arranged on the base of the machine into which articles are delivered successively.

A main conveyor chain 17 passes over wheels 18, 19, 20 and 21 and is driven by certain of the wheels through appropriate mechanism. The lower run of the chain 22 passes along near the tops of the several tanks while the upper run 23 passes along near the top of the machine.

Transfer conveyors consisting of endless chains 24, 25, 26 and the like, pick up the work rods on which the articles to be plated are supported, and lift the work rods vertically over the end partitions of the tanks, lower the rods so that the supported articles will enter the bath in the tank. A trackway 27 is arranged to support the lower run 22 of the chain so that the fingers or dogs thereon will engage the work rods 28 and move the same from one vertical transfer conveyor to the next vertical transfer conveyor.

Figures 3 and 4 show the plating section of the machine in which there is a plating tank 29 supported on the frame structure of the machine.

The main conveyor 17 passes along the machine beside the tanks so that work rods carried thereby may be delivered to the vertical transfer conveyor 30, carried up over the front end of the tank 29, and downwardly towards the tank.

Supplemental trackways are provided extending along the sides of the plating tank 29 and spaced a slight distance above the main conveyor 17. These trackways comprise insulated portions 31 and 32 with a central bus bar portion 33. The bus bar portion of the trackways is preferably midway of the supplemental trackways and is insulated at the bottom.

The work rods 28 are delivered successively to the supplemental trackways of the plating section.

The drawings illustrate three positions of the work rods in the plating tank 29 and will be referred to as the first position, second position and third position.

The work rods 28 have secured near the ends thereof slides 34 which are securely fastened to the rods and which are electrical conductors. The slides have flanges 35 to guide the same as moved along the supplemental trackways of the plating section as well as along the guideways adjacent the other tanks of the machine.

The supplemental guideways comprising the sections 31, 32 and bus bar 33 are arranged in supports 36 of the frame structure of the machine near to the sides of the tank 29.

The work rods are delivered to the plating section conveyors by the transfer conveyor 30 which is an endless chain running over sprockets 37 secured in the frame structure of the machine and driven by a bevel gear 38 meshing with gear 39 attached to one of the sprockets 37. The bevel gear 38 is keyed to shaft 40 which is driven by suitable drive mechanism and runs at a constant speed.

The conveyor chains for the plating section comprise, on each side of the tank, two endless chains 41 and 42 running over sprockets 43 and 44 respectively, with the horizontal runs 45, 46 of the chains in the same horizontal plane, which is above the top of the tank 29, and which plane is above the lower run 22 of the main conveyor chain 17, so that the rods delivered to the plating section of the conveyor will be free from interference by the main conveyor 17 so as to be moved independently of the same.

The delivery end of the chain 41 is adjacent the pick-up end of the chain 42.

Stub shafts 47 are journalled at 48 in the sides of the machine and each shaft has a sprocket wheel 49 on the outer end thereof. The inner ends of the shafts 47 carry two sprockets 50 and 51 which are spaced axially and keyed to the shaft 47. The chain 41 passes over the sprockets 51 while the chain 42 passes over the sprockets 50, the chains extending in opposite directions from the shafts 47.

Each chain 41 and 42 has secured to its fingers, lugs or dogs 52, 53 respectively, which may be adjusted along the chains.

Underlying the top runs 45 and 46 of the chains 41 and 42 respectively are channel or angle bars 54 which support the top runs of these chains in order that the lugs 52 and 53 on the chains 41, 42 will, at all times, be in contact with the work rods 28, assuring movement of the rods by these lugs.

A work rod 28 is brought downwardly by the transfer chain 30 with the ends of the rod 28 resting in cups 55 attached at intervals in the lengths of the chains 30. A rod is lowered by the chain 30 to the 1st position in the plating tank which is indicated at A in Figure 3. As the rod 28 is lowered into this 1st position A, the fingers 52 on the conveyor chain 41 contact the rod and move the same to the 2nd position B, where, by reason of the fact that the conveyor chain 41 passes over the sprocket 51, the finger 52 will move out of contact with the rod 28 in the second position B, thus leaving the rod at rest in the 2nd or B position.

The trackways are so constructed that as the rod is moved into position B, the slides 34 will move onto the bus-bars 33 and come to a stop on these bus-bars because the fingers 52 have been freed from engagement from the rods 28 in the manner heretofore described, and the fingers 53 on chain 42 are not as yet ready to remove the rod from this position.

The rod remains in the position B for a predetermined timed interval which is determined by the position of the fingers 52 and 53 on the chains 41 and 42, which, at the end of the period of rest, engages the rod in the B position and moves it to the 3rd or C position from where it is removed from the plating tank by a transfer conveyor 56.

During the time that the rod is in the 2nd or B position, that is, with the slides 34 thereof in contact with the bus-bars 33, an electric current is supplied to the bus-bars, and consequently to the work rod 28, which is the cathode, through a conductor 57.

The current controller is so arranged as to put the work rod 28, while in the 2nd or B position, that is, the position of rest, in circuit with a generator producing a current of predetermined density. The current continues until cut off by the controller, which is so timed with respect to the movement of the chains 41 and 42 as to supply current to the work rod 28 in the 2nd or B position only when said rod is at rest on the bus-bars 33. When the current has been cut off, the fingers 53 on the conveyor 42 then move the rod from the 2nd or B position to the 3rd or C position for withdrawal from the plating tank 29.

The current regulator is represented at 58 in Figure 3 and comprises a drum 59 mounted on a shaft 60 which is driven through gears 71 and 72 from the shaft 40 in timed relation to the movement of the transfer conveyors 30 and 56 and the conveyor chains 41 and 42. The anode connection (not shown) is carried to the generator so that when the brushes 61 of the controller are in contact with the metallic segmental ring 62 of the controller, current flows from the generator through the cathode, which is the work rod 28, the articles supported by said rod, the bath, to the anodes and back to the generator. When the insulated segment 63 of the controller contacts the brush 61, this current is interrupted and cut off, whereupon the work rod 28 is removed and the controller is so operated as to maintain the current cut off until another work rod is moved from the 1st or A position to the 2nd or B position, as heretofore described, whereupon the rod in the B position is put in circuit for plating the articles carried by the same.

The above parts are operated automatically and in timed relation, so that when the operation of the machine is started the work rods 28 supporting the articles to be plated are fed into the machine in the receiving end, and are automatically carried through the various tanks for preliminary cleaning and washing and then carried through the plating tank in the manner heretofore described, where the movement of the rod in the plating tank is stopped for an interval while the plating current is connected in circuit with the work rod in the B position. After plating, the work rod is transferred by the transfer conveyor 56 to rinsing and washing tanks, whereupon the articles are removed from the rods and the rods again supplied with new articles for application to the main conveyor 17 at the receiving end of the machine.

It will be observed that the work shift arrangement in the plating section is automatic receives the work rods as the same come from the preliminary stages of treatment, delivers these rods successively into the plating tank while the rod is supported on the insulated section 31 of the trackway and moves the rod into the 2nd or B position in engagement with the bus bars 33 where it is stopped, and while so stopped, is put in circuit with the generator for plating. The circuit is then interrupted by the automatic controller, the rod is then moved onto the insulated section 32 into the 3rd position where it is picked up and removed from the plating tank.

It will be observed that the work shift mechanism permits the application of the electric current to the work rod only when it is at rest and when in a certain position in the tank. This arrangement prevents any circuit passing through the article supported by the work rods in the 1st or A position and the 3rd or C position, thereby eliminating all discoloration, stain and detrimental results experienced in the machines now in use.

There is shown in Figure 3 and Figure 2 a hold-down device for pressing the work rod in the B position firmly against the bus-bar section 33 of the plating tank trackway.

The hold-down device comprises an arm pivoted in a cross-head arranged to slide vertically in a member of the machine frame. The arm has a weighted end so as to hold the arm normally in inclined position to the left, as viewed in Figure 3, in order that the forked end of the arm may engage the work rod as the same is being moved from the A to the B position. The forked end having engaged the rod, moves the rod in counterclockwise direction, sliding the cross-head upwardly so that the effect of the weight will bear against the work rod in the B position and press the slides 34 more firmly against the bus-bar section of the trackway.

The term "work rod" used in the claims is general and includes not only the rod per se but also the pieces or articles to be plated, as well as the means for suspending such articles from the rods and the claims are to be construed with such understanding.

While I have described more or less precisely the details of construction of my invention, yet I do not wish to be understood as limiting myself thereto, as I am aware that changes may be made in the arrangement and proportion of parts and that equivalents may be substituted, all without departing from the spirit and scope of my invention.

I claim as my invention:

1. An automatic work shift for plating machines comprising means for delivering a work rod to a plating tank, a trackway along said tank for receiving said rod, a bus bar section in said trackway, a chain for moving said rod along the trackway to said bus-bar section, and another chain for moving said rod from said bus bar section, said chains being arranged to leave said bar on said bus-bar in rest position for a predetermined interval of time.

2. An automatic work shift for plating machines comprising means for delivering a work rod to a plating tank, a trackway along said tank for receiving said rod, a bus-bar section in said trackway, a chain for moving said rod along the trackway to said bus-bar section, another chain for moving said rod from said bus-bar section, said chains being arranged to leave said bar on said bus-bar in rest position for a predetermined interval of time, means for supplying an electric current to said rod while on said bus-bar, said current supply means and said chains being operated in timed relation.

3. An automatic work shift for plating machines comprising a plating tank, a trackway along said tank, means for delivering a work rod to said tank, means for withdrawing a rod from said tank, and means for moving a rod in step by step movement through said tank, said latter mentioned means comprising two endless chains, sprocket wheels supporting and driving said chains, the active runs of the chains being in the same horizontal plane and adjacent said trackway, said chains being arranged so that the delivery end of one chain is adjacent the pick-up end of the other, with both the delivery end of the first and the pick-up end of the second adjacent the bus-bar section of the trackway, fingers on said chains so positioned that a time interval intervenes between the delivery of the rod by the first chain and the pick-up of said rod by the second chain.

4. An automatic work shift for plating machines comprising a plating tank, a trackway along said tank, said trackway containing a bus-bar section intermediate its ends, means for delivering the work rod to said tank, means for withdrawing a rod from said tank, means for moving a rod in step by step movement through said tank, said latter mentioned means comprising two endless chains, sprocket wheels supporting and driving said chains, the active runs of the chains being in the same horizontal plane and adjacent said trackway, said chains being arranged so that the delivery end of one chain is adjacent the pick-up end of the other, with both the delivery end of the first and the pick-up end of the second adjacent the bus-bar section of the trackway, fingers on said chains so positioned that a time interval intervenes between the delivery of the rod by the first chain and the pick-up of said rod by the second chain, said finger being adjustable along said chains to vary said time interval.

5. An automatic work shift for plating machines comprising a plating tank, a trackway along said tank, means for delivering a work rod to said tank, means for withdrawing a rod from said tank, means for moving a rod in step by step movement through said tank, said latter mentioned means comprising two endless chains, sprocket wheels supporting and driving said chains, the active runs of the chains being in the same horizontal plane and adjacent said trackway, said chains being arranged so that the delivery end of one chain is adjacent the pick-up end of the other, with both the delivery end of the first and the pick-up end of the second adjacent the bus-bar section of the trackway, fingers on said chains so positioned that a time interval intervenes between the delivery of the rod by the first chain and the pick-up of said rod by the second chain, means for supplying an electric current to said work rod during an interval of rest, said current supply means and said chain driving means being actuated in timed relation in such manner that the current to said rod is cut off before the same is moved by the second chain.

6. An automotive work shift for plating machines comprising a plating tank, a trackway along said tank, a bus bar section in said trackway intermediate the ends thereof, insulating sections comprising said trackway on each side of said bus bar section, two endless chains at one side of the tank, the active runs of the chains being in the same horizontal plane and so arranged that the delivery end of one chain is adjacent the pick-up end of the other and which position is adjacent the bus bar section of the trackway, said chains arranged to move a work rod onto said bus bar and stop said rod thereon for a predetermined period of time, means for supplying an electric current to said work rod while at rest on said bus bar, said current supply means and said chains being operated automatically and in timed relation.

7. An automatic work shift for plating machines comprising a plating tank, a trackway along said tank, means for delivering a work rod to said trackway, means for receiving and moving said work rod to a position of rest in said tank and subsequently moving said rod from the rest position to a position for transfer elsewhere, said means including two endless chains so disposed that the delivery end of one is adjacent the pick-up end of the other, fingers on said chains so disposed with relation to the movement thereof that an interval of time intervenes between the release of said rod by the first chain and the pick-up of the rod by the second chain, and means for supplying electric current to said rod during such interval.

8. An automatic work shift for plating machines comprising a plating tank, a trackway along said tank, the end portions of the trackway being insulated and the intermediate portion thereof comprising a bus-bar, means for delivering a work rod to the first insulated section of the trackway, means for removing a work rod from the last insulated section of the trackway, means for moving the work rod from the first insulated section to the bus-bar and after an interval of time, for moving said work rod from the bus-bar to the last insulated section of the trackway, said means comprising continuously moving conveyors arranged with the delivery end of one adjacent the pick-up end of the other, the said ends of the conveyors being adjacent the bus-bar section of the trackway, fingers on said chains for engaging the rod, the fingers being so disposed that said rod remains at rest on the bus bar section after delivery from the first chain and before pick-up by the second chain, means for supplying an electric current to the bus bar while the rod is at rest thereon, and said current supply means and said conveyors being operated automatically and in timed relation.

9. An automatic work shift for plating machines comprising a plating tank, a trackway along said tank, the end portions of the trackway being insulated and the intermediate portion thereof comprising a bus-bar, means for delivering a work rod to the first insulated section of the trackway, means for removing a work rod from the last insulated section of the trackway, means for moving the work rod from the first insulated section to the bus-bar and after an interval of time, for moving said work rod from the bus-bar to the last insulated section of the trackway, said means comprising continuously moving conveyors arranged with the delivery end of one adjacent the pick-up end of the other, the said ends of the conveyors being adjacent the bus-bar section of the trackway, fingers on said chains for engaging the rod, the fingers being so disposed that said rod remains at rest on the bus-bar section after delivery from the first chain and before pick-up by the second chain, means for supplying an electric current to the bus-bar while the rod is at rest thereon, and said current supply means and said conveyors being operated automatically and in timed relation.

10. In a machine for electroplating articles wherein the articles are moved through a plating tank, a trackway adjacent the plating tank for supporting articles in the plating tank, said trackway comprising a plurality of sections, one of said sections connecting the articles in the plating circuit, the other sections being insulated.

11. A machine for electroplating comprising a plating tank, a trackway above the tank for supporting articles to be plated, said trackway comprising a plurality of sections, one of said sections being a bus-bar, and means for moving the articles step by step through the tank while supported on said trackway.

12. A machine for electroplating comprising a plating tank, a trackway associated with said tank for supporting articles to be plated, said trackway comprising a plurality of sections, one of said sections being a bus-bar, and means for advancing the articles step by step through the tank in such manner that the articles come temporarily to rest on said bus-bar section.

13. A machine for electroplating comprising a plating tank, a trackway above said tank for supporting articles to be plated, said trackway comprising a plurality of sections, one of said sections being a bus-bar, and means for moving the articles through the tank in such manner that the articles come temporarily to rest on the bus-bar section, and means operable only while the articles are at rest to supply current to said bus-bar.

14. In combination, a plating tank, a trackway associated with said tank for supporting articles to be plated, said trackway including a bus-bar section, means so operated for advancing the articles step by step through the tank that the articles come to rest on the bus-bar section of the trackway, and additional means for forcing the objects into good electrical contact with said bus-bar section.

15. An automatic plating machine comprising means for delivering articles to be plated to a plating tank, means for advancing said articles to a position of rest in said tank, means operable to supply electric current to said articles only while they are at rest, and means for withdrawing articles from the tank, all of said means being actuated automatically and in timed relation.

16. An automatic plating machine for receiving a work rod and moving it along a plating tank to a position of rest, means effective after a predetermined interval for moving said rod from rest position, means for supplying current to said rod while in rest position, said current supply means being arranged to deliver current to said rod after the same comes to rest and to cut off the current before said rod is moved from the rest position, and means for operating all of the above means automatically and in timed relation.

17. An automatic plating machine comprising a plating tank, a trackway along said tank, a bus-bar in said trackway intermediate the ends thereof, means for receiving a work rod and moving the same onto said bus-bar, said means being released from the rod when the rod is on the bus-bar, a hold-down for said rod comprising an arm arranged on a sliding pivot in unbalanced position and having a forked end in the path of travel of the work rod to engage the same as said rod is moved along the trackway, said arm having a weight for opposing movement of the same by the work rod and for pressing the same downwardly against the work rod when the latter is at rest on the bus-bar.

18. A plating machine comprising a conveyor for delivering a rod to a plating tank, a conveyor for removing said rod from said tank, another conveyor for moving said rod, to a position of rest in said tank intermediate said first and second conveyors, means for putting said work rod in circuit with a generator current when in rest position, means for controlling the duration of said current, means for moving said rod from said rest position to said removing conveyor after said current is cut off, and all of said parts being operated automatically and in timed relation.

19. A machine for electroplating articles, comprising a plating tank, means for supportedly moving an article through said tank in such a manner that the article comes to rest for a predetermined period of time in a predetermined position in the tank, and means actuated in timed relation to movement of said article moving means arranged to supply current to said article only while said article is at rest in said position in the tank.

In testimony whereof I have hereunto subscribed my name at Chicago, Cook County, Illinois.

CONSTANTINE G. MILLER.